US010590554B2

(12) United States Patent
Prado Pueo

(10) Patent No.: US 10,590,554 B2
(45) Date of Patent: Mar. 17, 2020

(54) SAFE ANODE FOR ELECTROCHEMICAL CELLS

(71) Applicant: INDUSTRIE DE NORA S.P.A., Milan (IT)

(72) Inventor: Felix Prado Pueo, Monzon (ES)

(73) Assignee: INDUSTRIE DE NORA S.P.A., Milan (IT)

( * ) Notice: Subject to any disclaimer, the term of this patent is extended or adjusted under 35 U.S.C. 154(b) by 0 days.

(21) Appl. No.: 16/076,559

(22) PCT Filed: Apr. 26, 2017

(86) PCT No.: PCT/IB2017/052403
§ 371 (c)(1),
(2) Date: Aug. 8, 2018

(87) PCT Pub. No.: WO2017/187357
PCT Pub. Date: Nov. 2, 2017

(65) Prior Publication Data
US 2019/0048485 A1 Feb. 14, 2019

(30) Foreign Application Priority Data

Apr. 29, 2016 (ES) .................................. 201630554

(51) Int. Cl.
*C25C 7/02* (2006.01)
*C25C 7/00* (2006.01)
(Continued)

(52) U.S. Cl.
CPC .................. *C25C 7/02* (2013.01); *C25C 1/12* (2013.01); *C25C 7/00* (2013.01); *C25D 17/10* (2013.01);
(Continued)

(58) Field of Classification Search
None
See application file for complete search history.

(56) References Cited

U.S. PATENT DOCUMENTS 4,512,866 A 4/1985 Langley
5,679,240 A 10/1997 Anastasijevic et al.
(Continued)

FOREIGN PATENT DOCUMENTS

WO 2015/079072 A2 6/2015

OTHER PUBLICATIONS

International Search Report and Written Opinion for International Application No. PCT/IB2017/052403 (dated Jul. 18, 2017) (9 Pages).
(Continued)

*Primary Examiner* — Harry D Wilkins, III
(74) *Attorney, Agent, or Firm* — Lucas & Mercanti, LLP

(57) ABSTRACT

Safe anode for electrochemical cells, of the type of vertical anodes constituted of a hanging structure based on a first horizontal bar, second vertical distribution bars defined by a copper or aluminum core with a titanium exterior layer, and coated or uncoated titanium anode plates attached to the second distribution bars, on both sides, such that the safe anode incorporates an adapter element that comprises, at least, one current limiter assembly, arranged between, at least, one of the second vertical distribution bars, and, at least, one coated or uncoated titanium anode plate, connecting the vertical distribution bar to the coated or uncoated titanium anode plate.

15 Claims, 9 Drawing Sheets

(51) Int. Cl.
    *C25C 1/12*         (2006.01)
    *C25D 17/10*      (2006.01)
    *C25B 11/02*      (2006.01)
    *C25B 11/04*      (2006.01)
    *C25B 15/06*      (2006.01)

(52) U.S. Cl.
    CPC .......... *C25B 11/02* (2013.01); *C25B 11/0442* (2013.01); *C25B 15/06* (2013.01)

(56) References Cited

U.S. PATENT DOCUMENTS

| | | | |
|---|---|---|---|
| 6,245,209 B1 * | 6/2001 | Bill .......................... | C25C 7/00 204/227 |
| 8,038,855 B2 * | 10/2011 | Sandoval .................. | C25C 7/02 204/288 |
| 10,309,023 B2 * | 6/2019 | Prado Pueo ............. | C25C 7/02 |
| 2010/0051452 A1 | 3/2010 | Song et al. | |
| 2014/0209455 A1 * | 7/2014 | Prado ....................... | C25C 7/00 204/229.8 |
| 2016/0010233 A1 | 1/2016 | Grant et al. | |
| 2017/0009359 A1 * | 1/2017 | Prado Pueo ............. | C25C 7/02 |

OTHER PUBLICATIONS

International Preliminary Report on Patentability for International Application No. PCT/IB2017/052403 (dated Jun. 1, 2018) (6 Pages).

* cited by examiner

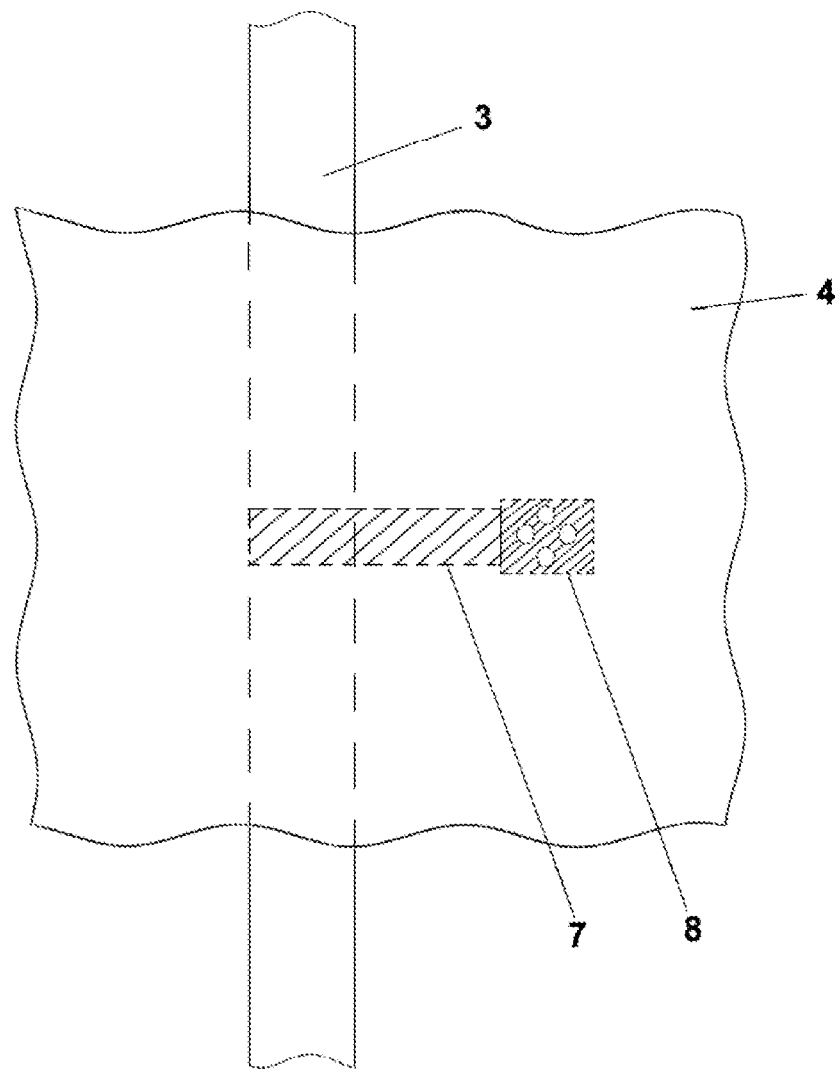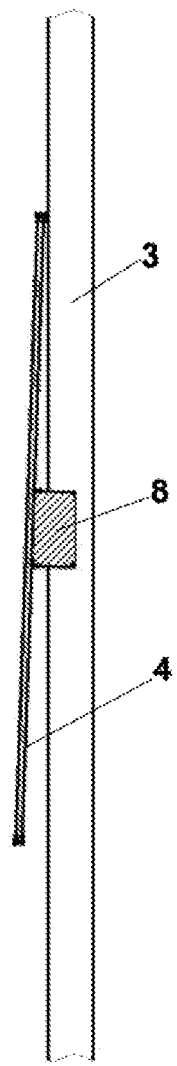
FIG.16 FIG.17
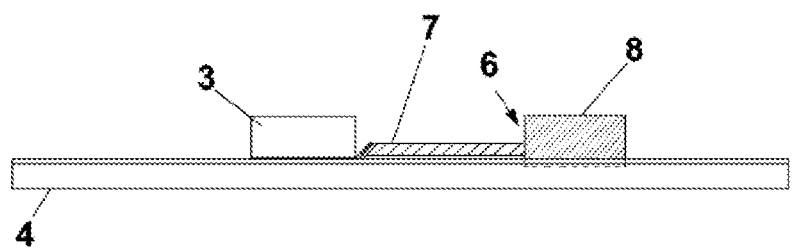
FIG.18

SAFE ANODE FOR ELECTROCHEMICAL CELLS

This application is a U.S. national stage of PCT/IB2017/052403 filed on Apr. 26, 2017 which claims the benefit of priority from Spanish Patent Application No. P201630554 filed Apr. 29, 2016 the contents of each of which are incorporated herein by reference.

OBJECT OF THE INVENTION

The following invention, as expressed in the heading of this specification, relates to a safe anode for electrochemical cells, of the type of vertical anodes used in electrochemical cells, and specifically in the electrowinning of metals, with the anodes consisting of a hanging structure, based on a horizontal current supply conductor bar and vertical distribution bars connected to the current supply bar, the distribution bars of which are defined by a copper or aluminum core, and a titanium outer layer or skin.

Based on this conventional embodiment, a first objective of the invention is that the electrical connection between the vertical distribution bars and the coated or uncoated titanium anode plate or plates is provided by means of respective adapter elements, which comprise a current limiter assembly, in order to prevent short-circuits that could destroy or damage the coated or uncoated titanium anode plates.

A second objective of the invention is to reduce the dispersion of the emission of oxygen bubbles with sulfuric acid, channeling them through the central part of the anode, for which reason the anode plates are arranged at an angle with respect to the vertical plane defined by the vertical distribution bars, generating a chimney effect that carries them and facilitates collection by a collector, avoiding harmful "acid mist" and its serious environmental effects.

This results in a significant economic advantage, because, on one hand, it avoids the destruction or damage to the coated or uncoated titanium anode plates, and on the other, if a short-circuit occurs, the affected plate is not destroyed and the other plates continue to function.

FIELD OF APPLICATION

The present specification describes a safe anode for electrochemical cells and is applicable to cells for the electrowinning of metals, such as copper.

BACKGROUND OF THE INVENTION

First, it may be stated that the containers, tanks, or electrochemical cells are filled with an electrolytic solution made up of, among other components, the metal to be deposited, and in which a plurality of anode/cathode pairs are submerged, in alternating positions, which, when supplied with electrical current, deposits the metal on the cathodes.

This means that when vertical anodes are used in said cells for the electrowinning of metals, said vertical anodes are constituted of a hanging structure, based on a horizontal current supply conductor bar and vertical distribution bars connected to the current supply bar, the distribution bars of which are defined by a copper or aluminum core, and a titanium outer layer or skin.

The coated or uncoated titanium anode plates are therefore electrically connected to the distribution bars, with the anodic electrolysis operation taking place on the surface of anode plates.

Conventional anodes present multiple combinations in terms of the number of vertical bars per horizontal current supply bar.

As indicated, the conventional vertical bars used in processes for electrowinning of metals are bimetallic bars with a copper or aluminum core and a titanium outer layer or skin. Copper or aluminum present the low electrical resistivity that is necessary for the effective transmission of large currents and the titanium protects the copper or aluminum against the chemical attack of the electrolyte, while at the same time allowing the connection of the coated or uncoated titanium anode plates to these vertical bars.

In this way, the anodes, and specifically the anode surfaces used in the processes for electrowinning of metals, in order to obtain optimum output and maximum capacity, operate close to the cathodes and have a large surface area in relation to the short anode-cathode distance, for example, a surface of 100×100 centimeters with a separation of 5 cm. This inevitably introduces the risk of electrical contact between the anode and cathode, or in other words, a short-circuit, in the case of any deformation or alteration of the flatness at any point on the cathode surface.

Cathodic surfaces are unstable by nature because their thickness changes quickly during the production process itself, and also because an increase in the thickness of the cathode at a single point on its surface reduces the anode-cathode distance, which reduces the electrical resistance, and applying Ohm's Law, increases ionic current at the point in question.

Increasing the current or ionic deposition increases the thickness of the metal deposited on said points, such that these events clearly present a positive feedback system, that, as we know, are intrinsically unstable processes, which in these cases end up creating anode-cathode contact, or a short-circuit.

Moreover, any alignment error or existing mechanical deformation will also cause direct anode-cathode contact, or a short-circuit.

Once direct electrical contact has been established between the anode and cathode, the potential electrochemical barriers between the electrolyte and the anode disappear, and the relatively high resistance of the electrolyte will also be eliminated. In these circumstances, the electrical current spikes to unacceptable values, damaging or destroying the coated or uncoated titanium anode plate, at the same time causing significant production losses.

Also, in the work process of the anodes in a cell for the electrowinning of metals, and specifically copper, oxygen bubbles with sulfuric acid are generated, a phenomenon known as "acid mist". This "acid mist" creates a serious environmental contamination problem and can directly affect the health of plant operators, requiring the use of masks in cell rooms and the deterioration of the environment in the area in which the plant is located.

For example, in case of copper electrowinning, the electrolyte is mainly made up of a solution of sulfuric acid and copper sulfate. In its normal electrolysis process, the anode generates oxygen bubbles that are contaminated, holding sulfuric acid; a large part of these bubbles leave the electrolyte and form part of the surrounding atmosphere creating what is known as acid mist.

Moreover, a current limiter is a device that reacts to and cancels any current above a particular value, this value is characteristic of the specific device or model.

A very familiar example is the fuses in our homes; when there is a short-circuit or direct contact of the wires in the network, the fuse is blown and disconnects, leaving us in the dark. We must then reset or replace the fuse to provide lighting again. We use this example to explain the concept of resetting and to go into more detail in regard to the possibility of having the lights come back on automatically, after a period of time, if the physical short-circuit is no longer present, and with no external intervention. In this case, the fuse is an automatic reset fuse.

There are two ways to protect against short-circuits; one is canceling or forcing the current to zero, and the other is modulating the current to admissible lower values. Both cases are considered to be current limiters, but we will call the former digital on-off limiters, and the latter analog limiters.

We can also cite patent document WO 2015/079072, which describes an anode structure for the electrowinning of metals, which comprises a horizontal support bar and vertical bars, coated with plastic or epoxy, to which anode plates, called sub-meshes with an area of 25 to 225 cm2, are attached to which electricity is supplied by means of the respective wiring and/or printed circuits, which are protected by a series of insulating structures, and that are installed inside the bars coated with plastic or epoxy.

DESCRIPTION OF THE INVENTION

The present invention relates to an anode for electrochemical cells as defined in claim 1, of the type of vertical anodes that comprise a hanging structure having/comprising:
- a horizontal current supply conductor bar and;
- one or more vertical distribution bars connected to the current supply bar, the distribution bars comprising:
  - a core of a conductive element selected from the group consisting of copper, aluminum, lead and alloy thereof, and
  - an outer layer or skin of a material selected from the group consisting of titanium or alloys thereof, valve metals or alloys thereof, and lead or alloys thereof, and;
- at least one coated or uncoated titanium anode plate associated with the vertical distribution bars, characterized in that the anode (1) incorporates an adapter element (6) arranged between at least one of the vertical distribution bars (3) and at least one of the coated or uncoated titanium anode plates (4), the adapter element (6) comprising at least one current limiter assembly (7) having a current limiter (10), said current limiter assembly (7) being associated with the at least one vertical distribution bar (3) and the at least one coated or uncoated titanium anode plate (4) in such a way that connects the vertical distribution bar (3) to the coated or uncoated titanium anode plate (4).

With the expression "vertical distribution bars" it is meant any and all prismatic element capable of withstanding a (vertical) hanging position and suitable for being associated or attached to an adapter element. Said one or more "vertical distribution bars" may have a section of circular, ovoidal or polygonal shape, they may exhibit different aspect ratios and, in the limit, be a panel, such as for example a lead panel. Besides, with the expression "anode plate" it is meant an element of any shape and size suitable for being used as an anode and which presents at least one surface capable of evolving oxygen or chlorine; more specifically the anodic plate may be a flat, curved or partially curved, corrugated, solid, porous, foraminous, cut, etched or perforated material.

This summary describes a safe anode for electrochemical cells, of the type of vertical anodes constituted of a hanging structure based on:
- a horizontal current supply conductor bar and;
- vertical distribution bars connected to the current supply bar, the distribution bars of which are made up of:
  - a copper or aluminum core, and;
  - a titanium outer layer or skin, and;
- at least one coated titanium anode plate associated with the vertical distribution bars, such that the safe anode incorporates an adapter element that comprises a current limiter assembly, arranged between at least one of the vertical distribution bars and at least one coated titanium anode plate, the adapter element of which connecting the corresponding vertical distribution bar to the coated titanium anode plate attached to it.

In a further embodiment, the hanging structure of the anode specifically consists of:
- a horizontal current supply conductor bar; and
- vertical distribution bars connected to the current supply bar, the distribution bars consisting of:
  - a copper or aluminum core, and
  - a titanium outer layer or skin; and
- at least one coated titanium anode plate associated with the vertical distribution bars.

In one practical embodiment of the invention, the adapter element of the safe anode is defined by a current limiter assembly that is attached directly to a vertical distribution bar and to a coated or uncoated titanium anode plate, connecting the vertical distribution bar to the anode plate.

This means that the adapter element is defined by the current limiter assembly itself.

In a first variant of practical embodiment of the invention, the adapter element of the safe anode is defined by a titanium strip that holds a current limiter assembly, with the titanium strip attached to a vertical distribution bar and the corresponding coated or uncoated titanium anode plate, the anode plate of which has a surface area of 250 to 1670 cm2, attached to the current limiter assembly.

In a second variant of practical embodiment of the invention, the safe anode adapter element is defined by a titanium strip that holds two current limiter assemblies, one at each of its two ends, with the titanium strip attached to a vertical distribution bar and the pair of current limiter assemblies is attached to the corresponding coated or uncoated titanium anode plate.

Likewise, the safe anode adapter element, which comprises at least one current limiter assembly, is attached to the corresponding vertical distribution bar, defining a slight angle with respect to a vertical plane, with the coated or uncoated titanium anode plate that is attached to it having the same angle. As "slight angle" it should be understood a minor angle with respect to the vertical line, that is to say, an angle of a minor magnitude. Preferably, as shown in the figures, the slight angle is equal or less than 3.25 degrees with respect to the vertical plane of the bar (3). In a more preferred embodiment, the slight angle is of 3 degrees with respect to the vertical plane of the bar (3).

The anode adapter elements that comprise at least one current limiter assembly may have different magnitudes in the slight angle at which they are mounted, with the anode plates associated with them also angled depending on the different angles with respect to a vertical plane.

Moreover, the anode adapter elements that comprise at least one current limiter assembly, and that have different magnitudes in the slight angle at which they are mounted, are attached, along the length of the corresponding second vertical distribution bar, with a magnitude that increases from the bottom to the top, causing a chimney effect on the upward flow of oxygen bubbles and acid.

The titanium strip, which forms part of the adapter element, may have a tubular configuration, incorporating a current limiter in its central internal portion, associated with at least one sheet bent at right angles that extends to the outside and to which the corresponding anode plate is attached.

Likewise, the titanium strip, which forms part of the adapter element, may have a block of epoxy resin or a similar material interposed on it, in which a current limiter is embedded.

Since the survival of the anode is normally affected by the aforementioned short-circuits and not due to other causes, an anode can be said to be safe when it is able to withstand short-circuits without suffering significant damage and remaining operational.

Therefore, the current limiter assembly, which forms part of the adapter element, and into which the current limiter is integrated, is defined by a box. With the term box it is meant a housing, a case, a partial or total enclosure that houses or includes, completely or in part, a titanium strip. The box can be made of any material, provided it is suitable for its intended purpose as well as for being immersed in the acid environment of an electrolytic bath for the electrowinning of metals. In a preferred case, the box is made of a conductive material suitable for the commented purpose, and more preferably it is made of titanium or its alloys. The box can comprise or not an insulating material, in such a way that in a particular embodiment the titanium strip is insulated by an insulating material of the box that contains it, the insulating medium of which incorporates one, two or more current limiters, connected by a terminal to the intermediate titanium strip and to the box by another terminal.

Likewise, the current limiter assembly, which forms part of the adapter element, and into which the current limiter is integrated, is defined by a pair of bimetallic titanium/copper pieces, with the copper surfaces facing each other, with a current limiter interposed between them, constituted of a polymer layer and respective sheets of copper on both surfaces, a transversal central and perimeter depression corresponding to the width of the copper of both opposing bimetallic pieces being embodied, said depression being filled with epoxy resin or a similar insulator.

It is another object of the invention an electrochemical cell for electrowinning of metals that comprises at least one anode as previously defined. In a preferred case, the cell is for electrowinning of a non-ferrous metal, including but not limited to copper or nickel.

To complete the description provided below, and for the purpose of helping to make the characteristics of the invention more readily understandable, the present specification is accompanied by a set of figures which by way of illustration and not limitation represent the most characteristic details of the invention.

BRIEF DESCRIPTION OF THE DRAWINGS

FIGS. 16, 17, ad 18 show respective front, elevation, and plan views of a practical embodiment in which the anode plates are mounted at a slight angle with respect to the vertical plane.

DESCRIPTION OF A PREFERRED EMBODIMENT

Figure 1:
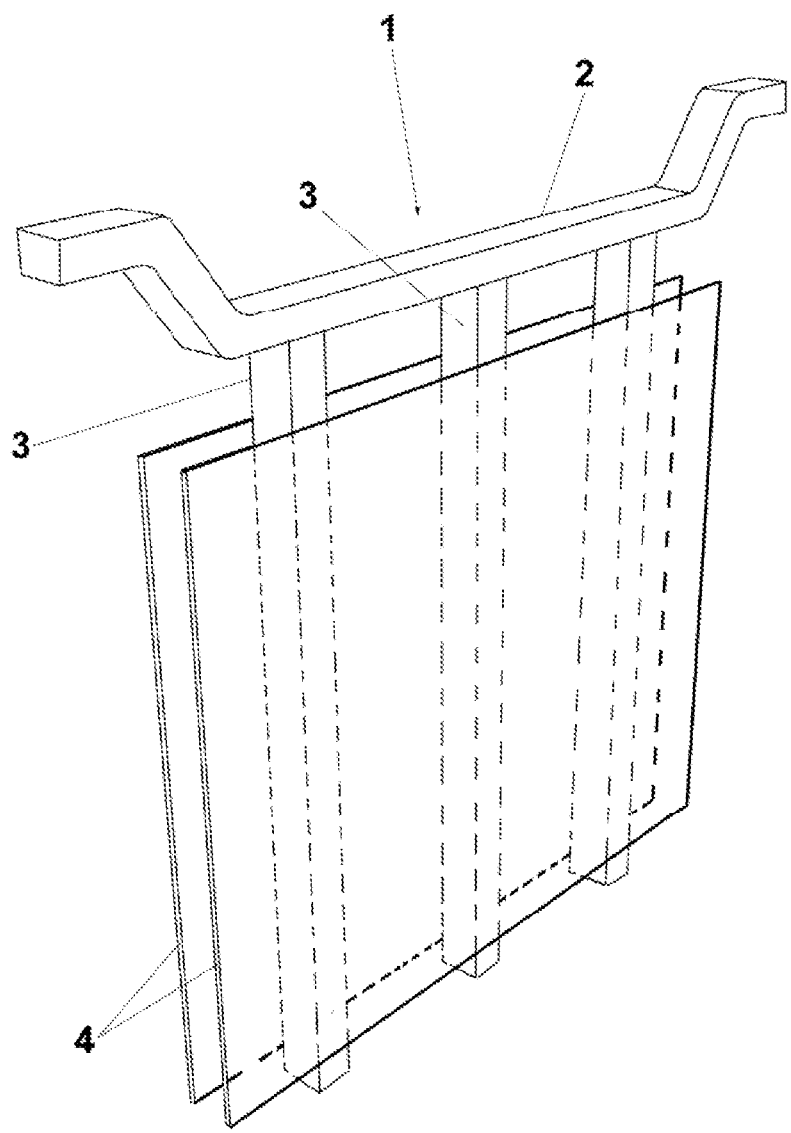
FIG. 1 shows a side view of a conventional anode, in which the horizontal current supply bar, the vertical distribution bars, and the two coated or uncoated titanium anode plates associated with the vertical distribution bars are visible.

As shown in the aforementioned figures and in accordance with the specified numbering, it can be seen how starting with a conventional configuration in which the anode 1 is constituted of a hanging structure based on a current supply conductor bar 2 and a series of vertical distribution bars 3, to which at least one coated or uncoated titanium anode plate 4 is attached (hereinafter we will refer to these simply as anode plates), with FIG. 1 of the drawings showing how, in said practical embodiment, the anode has two anode plates 4. In said conventional embodiment, the anode plates 4 are attached to the vertical distribution bars 3 by spot welds 5, as shown in FIG. 2 of the drawings.

Figure 4:
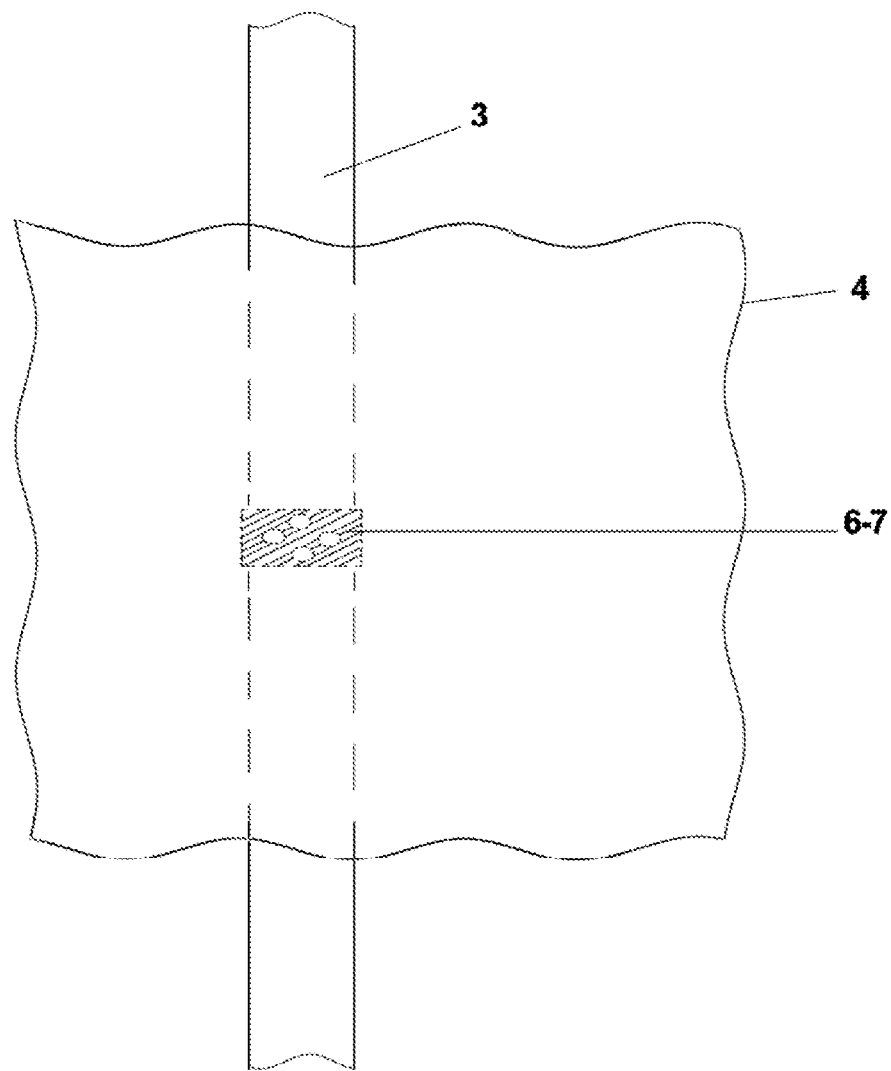
FIGS. 4 and 5 show respective front elevation and plan views of the attachment of a coated or uncoated titanium anode plate to a vertical distribution bar through an adapter element that comprises a current limiter assembly.

Starting with the conventional configuration described above, a first object of the invention is based on the incorporation of an adapter element 6, which comprises at least one current limiter assembly 7, as shown in FIG. 4, through which the electrical current supply or connection is established to the anode plates 4 from the corresponding vertical distribution bar 3.

Figure 5:
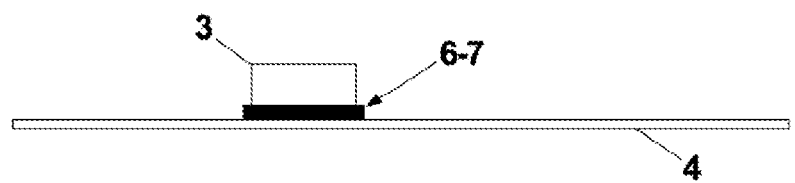

In accordance with FIGS. 4 and 5, in one practical embodiment the adapter element 6 comprises a current limiter assembly 7, which is attached directly to a vertical distribution bar 3 and to an anode plate 4, such that the electrical current reaches the anode plate through the current limiter 7 from the vertical distribution bar 3. In this embodiment, the current limiter assembly 7 itself acts as the adapter element 6.

Figure 6:
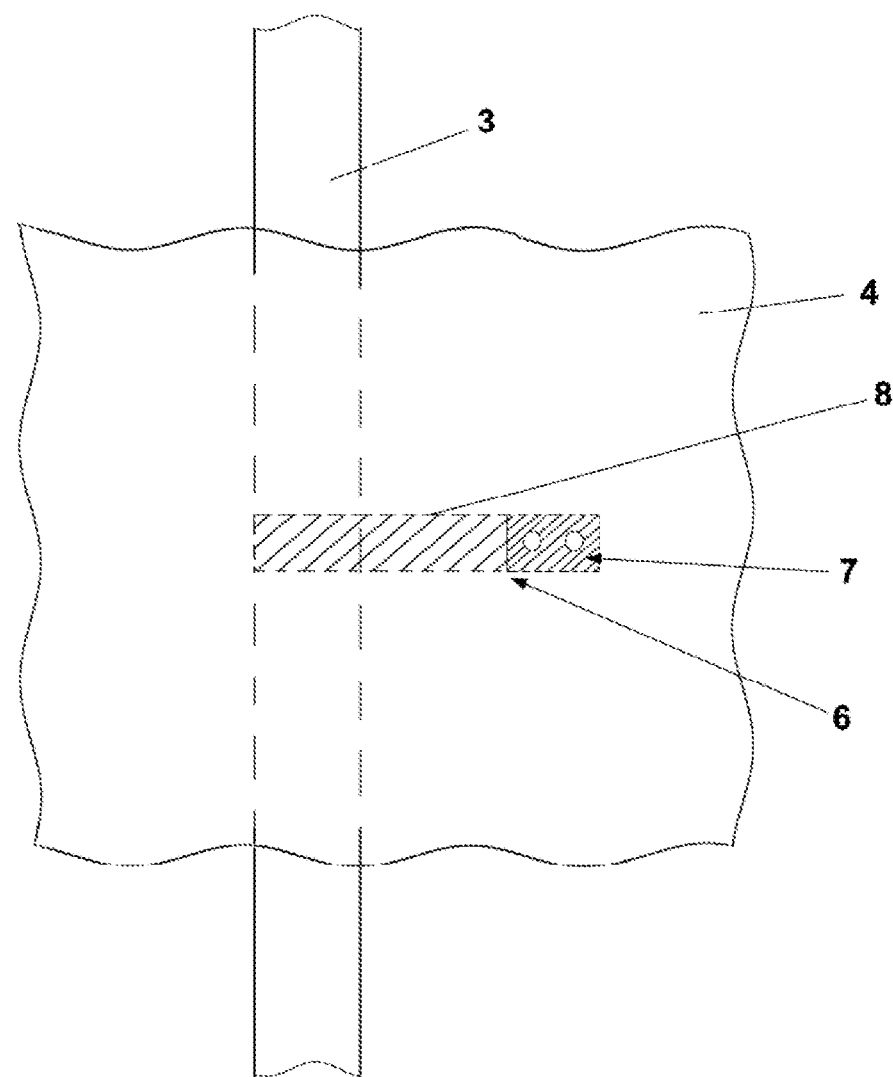
FIGS. 6 and 7 show respective front elevation and plan views of the attachment of a coated or uncoated titanium anode plate to a vertical distribution bar through an adapter element that comprises, as specified in a first practical embodiment, a titanium strip and a current limiter assembly.
Figure 7:
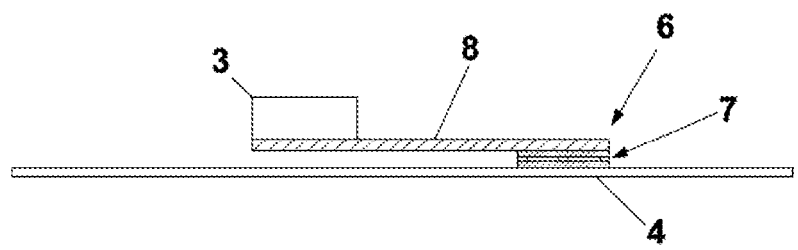
Figure 8:
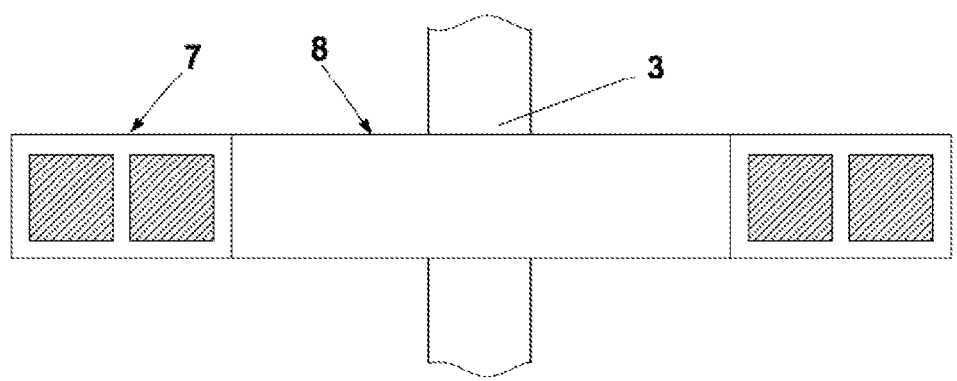
FIG. 8 shows a front view of an adapter element attached to a vertical distribution bar constituted of a titanium strip and with the respective current limiter assemblies at its ends.

In addition, according to FIGS. 6 and 7 of the drawings, in a first variant of a practical embodiment, the adapter element 6 is defined by a titanium strip 8 which is attached at one of its ends to a vertical distribution bar 3 and at the other end it incorporates a current limiter assembly 7, while, according to FIG. 8 of the drawings, in a second variant of a practical embodiment, the adapter element 6 is made up of a titanium strip 8, attached to a vertical distribution bar 3, and which has both current limiter assemblies 7 at each end, to which the respective anode plate 4 is attached, the electrical current reaching the anode plates 4, from the vertical distribution bar 3, though the titanium strip 8 and the corresponding current limiter 7.

The current limiter assembly, preferably auto-resetting, will be embodied using any mechanism available in the industry, that is to say, a bimetallic breaker, digital fuses with automatic reset, analog fuses with automatic reset, transistors with cutoff or regulation, etc.

Figure 9:
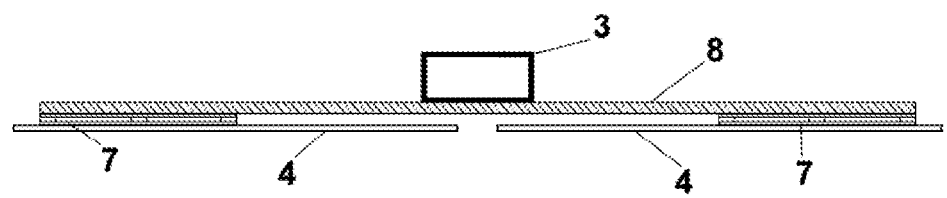
FIG. 9 shows a plan view of an embodiment in which the adapter element comprises, according to second practical embodiment, a titanium strip and two current limiter assemblies.
Figure 10:
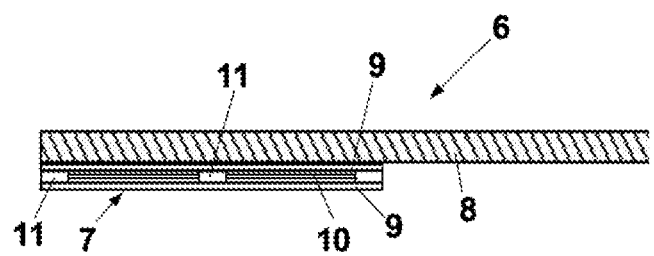
FIGS. 10 and 11 show respective cross-sectional views of the connection of a current limiter assembly, according to two practical embodiment variations, to the end of a titanium strip.

By way of example, and in accordance with FIGS. 8, 9, and 10 of the drawings, we can state that a first type of current limiter assembly 7 to be used as a component of the adapter element 6 can be defined by a pair of titanium/copper bimetallic pieces 9, with the copper surfaces facing each other, with a current limiter 10 interposed between them, constituted of a layer of polymer and respective sheets of copper on both sides, with a transversal central and perimeter depression corresponding to the width of the copper of both bimetallic pieces 9 facing each other, said depression being filled with epoxy resin 11 or a similar insulator.

In this way, FIG. 8 of the drawings shows how, in regard to the current limiter assembly 7, the two shaded parts would correspond to the copper of the bimetallic piece 9 and the outline around them would correspond to the transversal central and perimeter depression that, in the connection of the two bimetallic pieces 9 with the current limiter 10 itself interposed between them, it would be filled with epoxy resin 11 or another insulating material.

Figure 11:
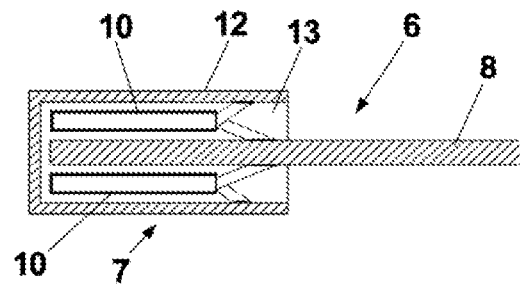
Figure 12:
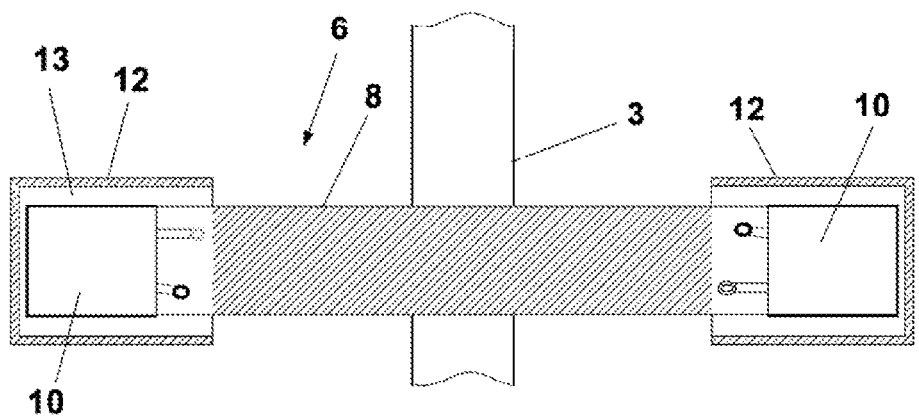
FIGS. 12 and 13 show a front view of the attachment of an adapter element constituted of a titanium strip and two current limiter assemblies, to a vertical bar, and a plan view with the respective anode plates attached to the current limiter assemblies.
Figure 13:
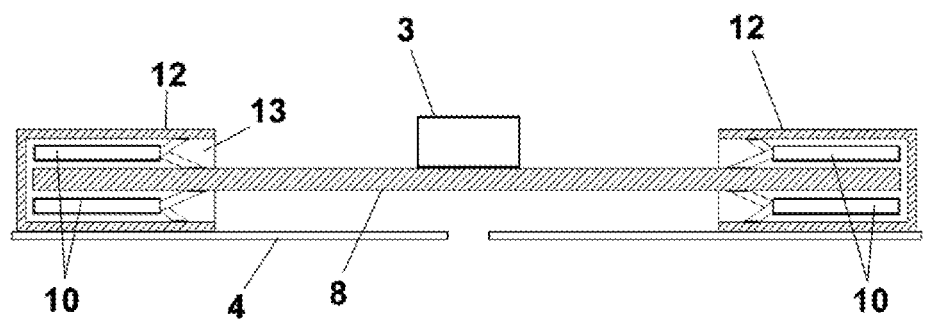

A second type of current limiter assembly 7, according to FIGS. 11, 12, and 13 of the drawings, may be constituted of a titanium box 12 in which one end of the titanium strip 8 is housed with an insulating material 13 interposed, and the insulating material 13 of which incorporates two current limiters 10 into it, such that, preferably, it incorporates two titanium boxes 12, as shown in FIG. 13 of the drawings, one at each end of the titanium strip 8, which is connected by a terminal to the titanium strip 8, and by its other terminal to the titanium box 12, in other words, the flow of electricity would be vertical distribution bar 3-titanium strip 8-current limiter 10-titanium box 12-anode plate 4.

We note that we omit the explanation for the extension to 3, 4, etc. limiters per adapter element because we consider it obvious based on the cases presented with 1 and 2 limiters per adapter.

The insulating material 13 may be a layer of epoxy resin or plastic material, or any other equivalent material.

Figure 14:
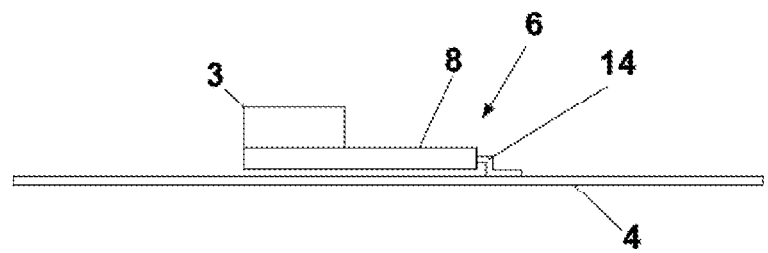
FIG. 14 shows a plan view of a first variant of a practical embodiment of the titanium strip, which forms part of the adapter element, with a tubular configuration and incorporating at least one current limiter inside thereof, associated with an extending sheet bent at right angles to which the corresponding anode plate is attached.

Logically, the structure described in regard to the adapter element, can likewise have other embodiments equivalent to those described, and thus, in FIG. 14 of the drawings, it can be seen how the titanium strip 8, which forms part of the adapter element 6, may have a tubular configuration and house the current limiter 10 in the inside thereof, perfectly insulated, associated to a first sheet 14 bent at right angles to which the corresponding anode plate 4 is attached. Likewise, a double configuration is also possible, such that two sheet 14 bent at right angles extend from the inside of the tubular strip 8, one at each end, to which the corresponding anode plates 4 are attached.

Figure 15:
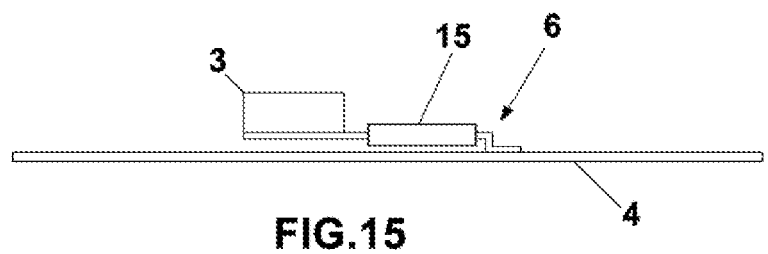
FIG. 15 shows a plan view of a second variant of a practical embodiment of the titanium strip, which forms part of the adapter element, in which the current limiter itself is embedded in a block of epoxy resin or a similar material, with the aforementioned titanium strip divided by the limiter, said titanium strip attached to a vertical bar at one end and to the corresponding anode plate at the other.
Figure 19:
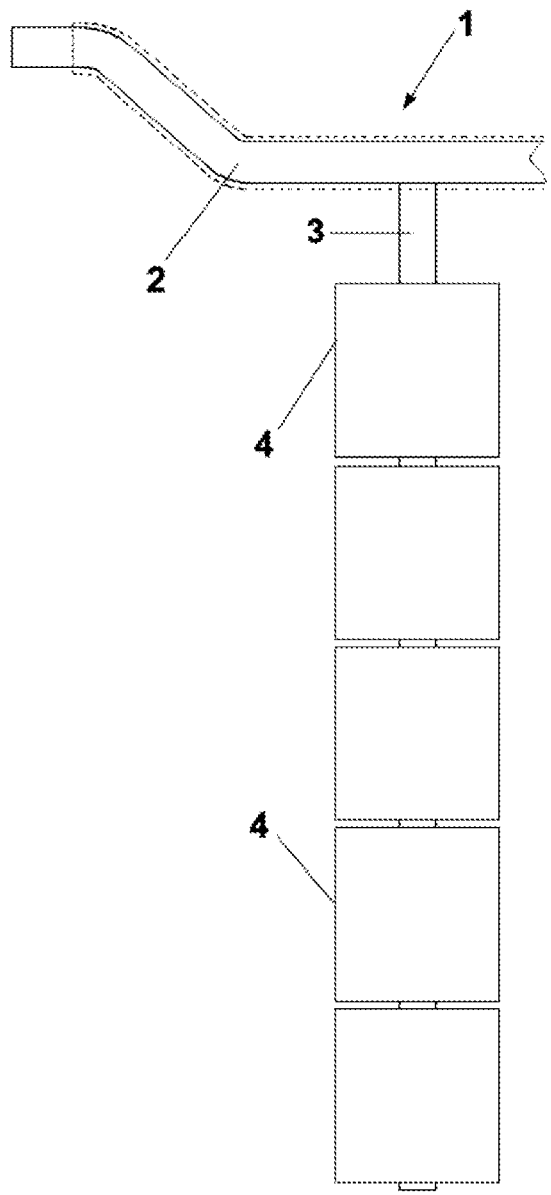
FIGS. 19 and 20 show a front and plan view of a practical embodiment in which a series of coated or uncoated titanium anode plates are attached to a second vertical distribution bar, showing how the anode plates have a slight angle, the angle of which increases from the lower portion to the upper portion, or in other words, from bottom to the top, generating a chimney effect.

Likewise, according to the embodiment of FIG. 15, the current limiter itself, which forms part of the adapter element 6, may be embedded in a block 15 of epoxy resin interposed on the titanium strip 8, it being divided in two parts, and the titanium strip 8 of which is bent at right angles in order to be able to attach it to the respective anode plate 4. As in the previous case, the adapter element may have a double configuration to attach it to two anode plates 4.

The number of vertical distribution bars 3 and anode plates 4 per anode 1 does not affect the object of the invention, but an adequate number of these would make it possible to adjust the performance and cost of the installation, such that a practical number of elements is: 3 vertical bars, 30 adapter elements per anode where each one feeds 2 anode plates, therefore a total of 60 anode plates per anode. In addition, the anode plates have an area of 250 to 1670 $cm^2$.

Figure 2:
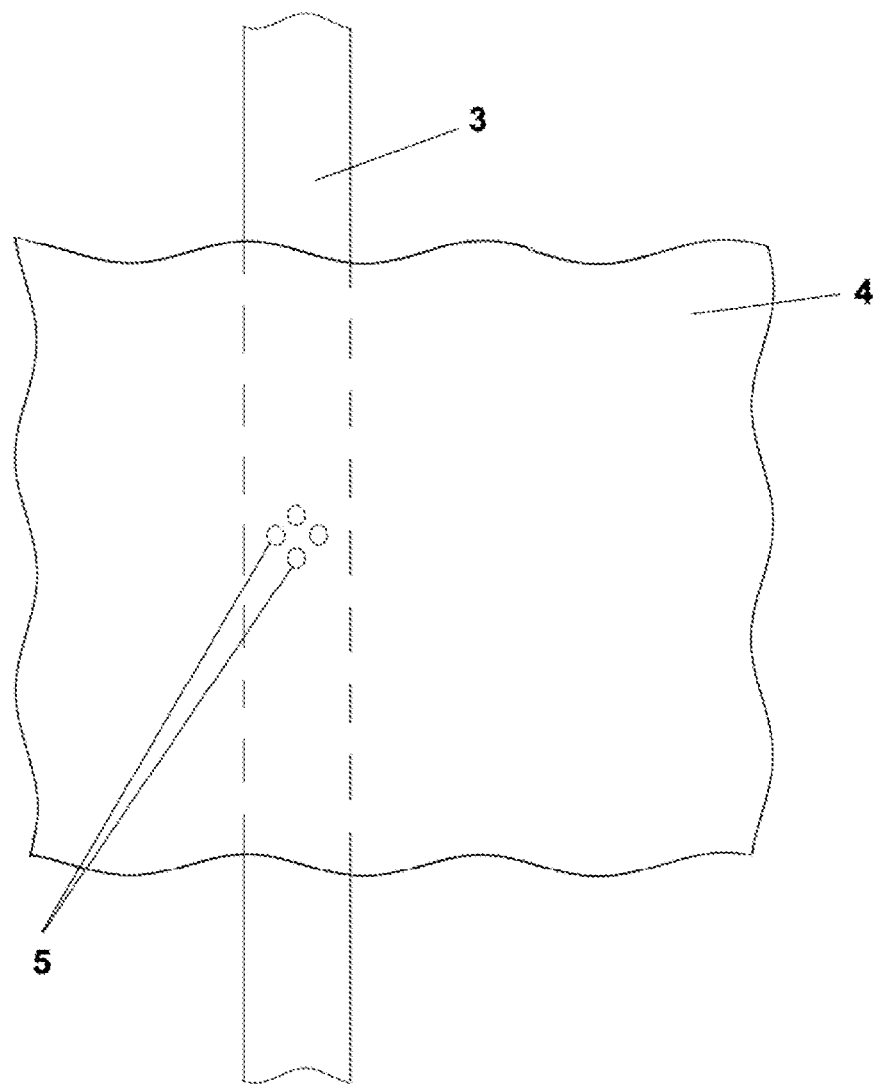
FIGS. 2 and 3 show respective front elevation and plan views of the conventional attachment by welding of the coated or uncoated titanium anode plate to a vertical bar.
Figure 3:
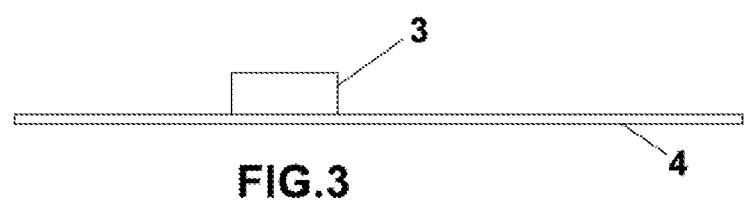

In addition, in a conventional anode, the number of anode plates 4 is one or two, such that in the case of two plates, there is one per surface, as shown in FIG. 1 of the drawings. Although the object of the invention can be applied to this conventional model, its effectiveness increases if a larger number of anode plates 4 are installed per anode, and also, the cost and installation difficulties would prevent excessively high values, thus establishing a compromise between the two.

We consider that an area of anode material defines an anode plate that is different from another provided that the electrical resistance between both areas is sufficiently high so that when a cathodic contact is established with one of them, the other can continue its process of electrolysis, at least to the order of 30% of activity.

Each adapter element 6 will comprise at least one current limiter assembly 7, which in case of a short-circuit will cut off the current or will at least limit that current to acceptable values, acceptable values being considered to be values that are not dangerous to the integrity of the anode and that do not represent a large loss of current. We recommend a value similar to the normal operating or nominal current, but we could work with higher values without significantly affecting performance up to a short-circuit current that does not exceed five times the value of the nominal operating current.

Figure 20:
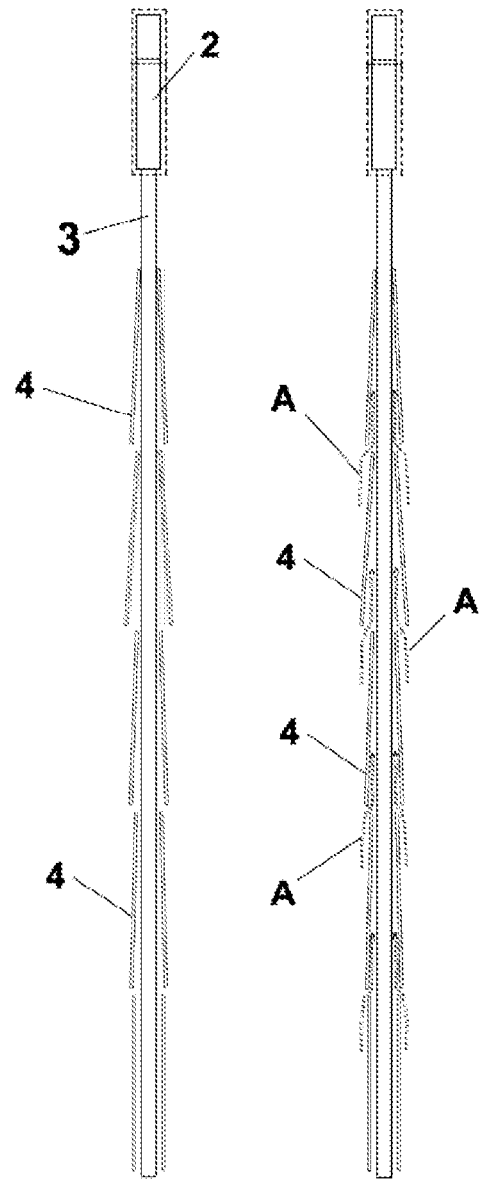
Figure 21:
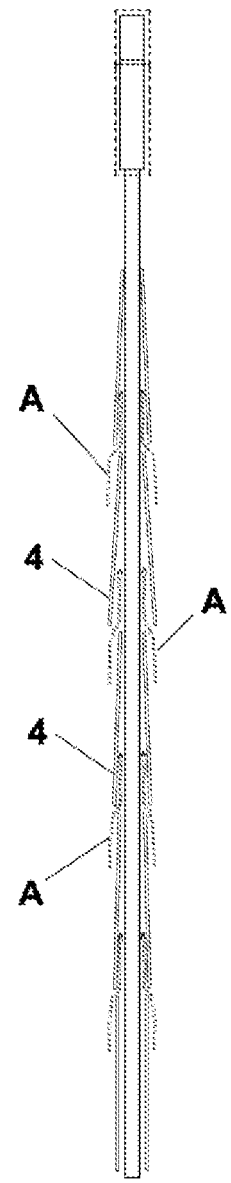
FIG. 21 shows a side elevation of the embodiment of the previous figure in which the path that the bubbles follow as a result of the chimney effect created by the angled arrangement of the anode plates is shown.

In addition, a second objective of the invention is to try to control the emissions of "acid mist" produced by anodic electrolysis. To do this, in the cells for the electrowinning of metals, such as copper, for anodes that feed two anodic plates 4, as shown in FIG. 1, spaced between 10 to 30 mm apart, by means of arranging the anode plates 4 at a slight angle, as shown in FIGS. 17, 20, and 21, it is possible to control and channel the bubbles produced, obtaining the path followed, according to the arrows "A", as a result of the angle of the anode plates, which can be obtained in a very wide variety of ways.

Moreover, varying the magnitude of the angle of the anode plates, and arranging them with an increasing angle from the bottom up an arrangement is created, in an inverted herringbone pattern, that generates a chimney effect that makes it possible to avoid dispersion and allows controlled emission of the acid bubbles as they are confined and rise as if in a chimney between the two sides of the anode plates of an anode.

The angle of the anode plates, as we mentioned, can be achieved in different ways, and as such, in the first place, the adapter element 6 that comprises a current limiter assembly 7, FIG. 5 of the drawings, can be attached to the vertical distribution bar 3 directly with the desired angle, or the titanium strip 8 itself may be attached to the corresponding vertical distribution bar 3 according to the desired angle or the titanium strip 8 itself, as shown in FIGS. 17 and 18, may be twisted and its ends may be angled, and when the corresponding current limiter assembly is attached, the anode plate attached to it will has the desired angle.

This phenomenon that concentrates the upward flow of bubbles inside the anode provides the following advantages:
reduction of the resistance of the electrolyte to the passage of the current between the anode and cathode, because the upward bubbles between the anode and cathode are insulators, so they increase the effective resistance of the electrolyte;
more uniform copper deposition on the cathode plate; it is well known that there is higher current density, and therefore a higher incidence of short-circuits in the lower part of the anode, or in other words, a slightly greater thickness of copper on the lower part. If the bubbles that concentrate at the upper part are prevented between the anode and the cathode, the copper plate that is obtained will be flatter with a smaller difference in thickness between the upper and lower parts of the copper plate;
reduce the probability that these bubbles will reach the cathode and cause oxidation, which has a negative effect on the efficiency of the process of cathodic deposition of the metal and its quality, and;
when a large percentage of acid bubbles rise through the narrow inner area of the two anodic surfaces, the installation of a collector at the exit of the chimney will allow very effective collection of the "acid mist" and, as a result, significantly reduce environmental contamination.

Figure 22:
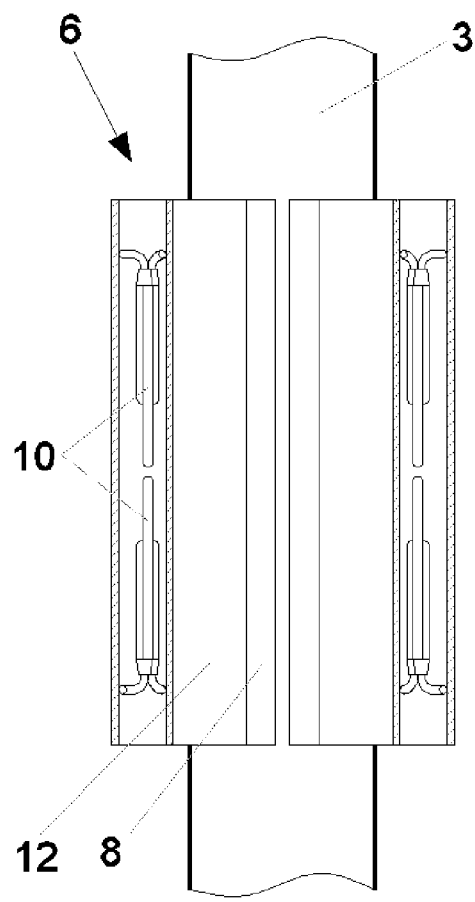
FIGS. 22 and 23 show a front view of the attachment of an adapter element comprising a current limiter assembly having a current limiter and an internal border that is a titanium strip having a U shape and attached to a vertical bar, said titanium strip being housed in an external border that is a box fashioned as an U-shaped container, and a plan view with the respective anode plates attached to the current limiter assembly.
Figure 23:
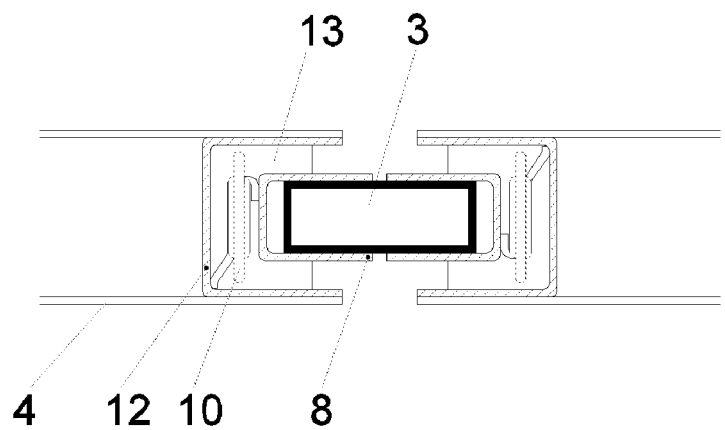

In addition, in one practical embodiment shown in FIGS. 22 and 23 of the drawings, the current limiter assembly (7) comprises at least an external border that is a box (12) containing an insulating material (13) and at least one internal border that is a titanium strip (8), said at least one internal border being partially or completely housed within said at least one external border, said at least one external border and at least one internal border having a U-shaped profile, in such a way that the at least one internal border is attached and partially enfolds a portion of at least one of said one or more vertical distribution bars (3) and said at least one external border being associated or attached to at least one anode plate (4).

This embodiment has the advantage of simplifying the production of the adapter elements and reduce the production costs. In fact, said embodiment may provide an improvement in terms of manufacturing, integration and electrical efficiency of the adapter element according to the invention. Regarding the manufacturing, the U-shaped profile of the titanium strip (8) and the box (12) allows to efficiently manage and/or reduce the amount of titanium required to build the adapter element. The container is constructed from two U profiles by placing one inside the other; these profiles are manufactured in long strips automatically and with high efficiency using folding machines without the need for welding and difficult cuts. Besides, welding the leads of current limiters it is done with much comfort and efficiency, lending itself to being robotized process; this means high manufacturing capacity at very competitive costs. Finally, with regard to the electrical efficiency, it should be taken into account that by wrapping or surrounding the current distribution bar with the adapter itself, the current path is perpendicular to the face of the adapter, which means maximum section and minimum length of the circuit.

The embodiment hereinbefore described can be used in a configuration that allows a chimney effect, if so desired. In such case it is the anode plate to be mounted with a tilt or bend with respect of the vertical position to direct the flow of the gas bubbles from the electrochemical reaction taking place at the anode. For example the anode plates are bent to be shaped like the integral symbol "∫", or any other shapes that the skilled person would easily recognize as suitable for the purpose. Alternatively, between the anode plates and the adapter element, it is possible to insert a conductive wedge or shaper that allow welding the anode plate with a an angle with respect to the vertical direction.

Finally, the present invention further relates to the following embodiments A-K:

A) A safe anode for electrochemical cells, of the type of vertical anodes constituted of a hanging structure based on:
  a horizontal current supply conductor bar and;
  vertical distribution bars connected to the current supply bar, the distribution bars of which are defined by:
    a copper or aluminum core, and;
    a titanium outer layer or skin, and;
  at least one titanium anode plate coated and associated with the vertical distribution bars,
characterized in that the safe anode (1) incorporates a safe anode adapter element (6), arranged between at least one of the vertical distribution bars (3) and at least one coated titanium anode plate (4), the adapter element (6) of which comprises at least one current limiter assembly (7) into which the current limiter (10) is integrated, which, associated with a vertical distribution bar (3) and a coated titanium anode plate (4), connects the vertical distribution bar (3) to the coated titanium anode plate (4).

B) The safe anode for electrochemical cells, according to the embodiment of item A, characterized in that the adapter element (6) of the safe anode is defined by a current limiter assembly (7), into which the current limiter (10) is integrated, being attached to a vertical distribution bar (3) and a coated titanium anode plate (4).

C) The safe anode for electrochemical cells, according to the embodiment of item A, characterized in that the adapter element (6) of the safe anode is defined by a titanium strip (8), holding at least one current limiter assembly (7), the titanium strip (8) being attached to a vertical distribution bar (3) and the corresponding coated titanium anode plate (4) being attached to the current limiter assembly (7).

D) The safe anode for electrochemical cells, according to the embodiment of item A and C, characterized in that the adapter element (6) of the safe anode is defined by a titanium strip (8), holding two current limiter assemblies (7), one at each end, the titanium strip (8) being attached to a vertical distribution bar (3) and the corresponding coated titanium anode plate (4) being attached to the pair of current limiter assemblies (7).

E) The safe anode for electrochemical cells, according to the embodiment of item A, characterized in that the adapter element (6) of the safe anode, which comprises at least one current limiter assembly (7), is attached to the corresponding vertical distribution bar (3), defining a slight angle with respect to a vertical plane, with the coated titanium anode plate (4) that is attached to it having the same angle.

F) The safe anode for electrochemical cells, according to the embodiment of item E, characterized in that the adapter elements (6) of the anode that comprise at least one current limiter assembly (7), may have different magnitudes in the slight mounting angle thereof, the anode plate (4) being associated with them also being angled depending on different angles with respect to a vertical plane.

G. The safe anode for electrochemical cells, according to the embodiment of item F, characterized in that the adapter elements (6) of the anode that comprise at least one current limiter assembly (7), and that have different magnitudes in the slight mounting angle thereof, are attached, along the length of the corresponding second vertical distribution bar (3), with a magnitude that increases from the bottom to the top, causing a chimney effect.

H) The safe anode for electrochemical cells, according to the embodiment of item C, characterized in that the titanium strip (8), which forms part of the adapter element (6), has a tubular configuration, incorporating a current limiter (10) in its central internal portion, associated with at least one sheet (14) bent at right angles that extends to the outside and to which the corresponding anode plate (4) is attached.

I) The safe anode for electrochemical cells, according to the embodiment of item C, characterized in that the titanium strip (8), which forms part of the adapter element (6), has a block (15) of epoxy resin or a similar material interposed on it, in which a current limiter (10) is embedded.

J) The safe anode for electrochemical cells, according to the embodiment of item A, characterized in that the current limiter assembly (7), which forms part of the adapter element (6), and into which the current limiter (10) is integrated, is defined by a box (12) that houses a titanium strip (8), insulated by an insulating material (13) of the box (12) that contains it, the insulating material (13) of which incorporates two current limiters (10), connected by a terminal to the intermediate titanium strip (8) and to the box (12) by the other terminal.

K) The safe anode for electrochemical cells, according to the embodiment of item A, characterized in that the current limiter assembly (7), which forms part of the adapter element (6), and into which the current limiter (10) is integrated, is defined by a pair of bimetallic titanium/copper pieces (9), with the copper surfaces facing each other, with a current limiter (10) interposed between them, constituted of a polymer layer and respective layers of copper on both sides, with a transversal central and perimeter depression corresponding to the width of the copper of both opposing bimetallic pieces (9), said depression being filled with epoxy resin (11) or a similar insulator.

The invention claimed is:

1. An anode for electrochemical cells, of the type of vertical anodes provided with a hanging structure having:
    a horizontal current supply conductor bar and;
    one or more vertical distribution bars connected to the current supply bar, the distribution bars comprising:
        a core of a conductive element selected from the group consisting of copper, aluminum, lead and alloy thereof, and
        an outer layer or skin of a material selected from the group consisting of titanium or alloys thereof, valve metals or alloys thereof, and lead or alloys thereof, and;
    at least one coated or uncoated titanium anode plate associated with the vertical distribution bars,
wherein the anode incorporates an adapter element arranged between at least one of the vertical distribution bars and at least one of the coated or uncoated titanium anode plates, the adapter element comprising at least one current limiter assembly having a current limiter, said current limiter assembly being associated with the at least one vertical distribution bar and the at least one coated or uncoated titanium anode plate in such a way that connects the vertical distribution bar to the coated or uncoated titanium anode plate.

2. The anode for electrochemical cells according to claim 1, wherein the adapter element is attached to the vertical distribution bar and to the at least one coated or uncoated titanium anode plate.

3. The anode for electrochemical cells according to claim 1, wherein the adapter element of the anode comprises a titanium strip that holds the at least one current limiter assembly, in such a way that the titanium strip is attached to the vertical distribution bar and the current limiter assembly is attached to the corresponding coated or uncoated titanium anode plate.

4. The anode for electrochemical cells according to claim 3, wherein the titanium strip has a tubular configuration, incorporating the current limiter in its central internal portion associated with at least one sheet bent at right angles that extends to the outside of the corresponding anode plate to which the sheet is attached.

5. The anode for electrochemical cells according to claim 3, wherein the current limiter of the adapter element is embedded in a block of epoxy resin or a similar insulator interposed on the titanium strip.

6. The anode for electrochemical cells according to claim 3, wherein the current limiter assembly comprises a box having an insulating material that houses the titanium strip, the insulating material incorporating two current limiters connected to the titanium strip by a terminal and to the box by another terminal.

7. The anode for electrochemical cells according to claim 6, wherein the current limiter assembly comprises at least an external border that is a box containing an insulating material and at least one internal border that is a titanium strip, said at least one internal border being partially or completely housed within said at least one external border, said at least one external border and at least one internal border having a U-shaped profile, in such a way that the at least one internal border is attached and partially enfolds a portion of at least one of said one or more vertical distribution bars and said at least one external border being associated or attached to at least one anode plate.

8. The anode for electrochemical cells according to claim 1, wherein the adapter element of the anode comprises a titanium strip having two ends that hold two current limiter assemblies, one at each end, in such a way that the titanium strip is attached to the vertical distribution bar and the pair of current limiter assemblies is attached to the corresponding coated or uncoated titanium anode plate.

9. The anode for electrochemical cells according to claim 1, wherein the adapter element of the anode is attached to the vertical distribution bar defining a slight angle with respect to the vertical plane of the bar, in such a way that the coated or uncoated titanium anode plate attached to the current limiter assembly also has the same angle.

10. The anode for electrochemical cells, according to claim 9, wherein the anode comprises more than one adapter element, each adapter element being attached to the vertical distribution bar defining a slight angle with respect to the vertical plane of the bar which has a different magnitude from the other angles, in such a way that the anode plates associated with the current limiter assemblies also have the corresponding angles.

11. The anode for electrochemical cells according to claim 9, wherein the angle is equal or less than 3.25 degrees with respect to the vertical plane of the bar.

12. The anode for electrochemical cells, according to claim 10, wherein the magnitude of the angles defined by the adapter elements with respect to the vertical plane of the bar increases from the bottom to the top along the length of the vertical distribution bar.

13. The anode for electrochemical cells according to claim 1, wherein the current limiter assembly comprises a pair of bimetallic titanium/copper pieces, with the copper surfaces facing each other, with a current limiter interposed between them, constituted of a polymer layer and respective layers of copper on both sides, with a transversal central and perimeter depression corresponding to the width of the copper of both opposing bimetallic pieces, said depression being filled with epoxy resin or a similar insulator.

14. An electrochemical cell for electrowinning of metals wherein it comprises at least one anode as defined in claim 1.

15. The electrochemical cell of claim 1, wherein the metal is a non-ferrous metal.

* * * * *